United States Patent
Chang (10) Patent No.: US 7,422,357 B1
(45) Date of Patent: Sep. 9, 2008

(54) OPTICAL PLATE AND BACKLIGHT MODULE USING THE SAME

(75) Inventor: Shao-Han Chang, Taipei Hisien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/843,670

(22) Filed: Aug. 23, 2007

(30) Foreign Application Priority Data

May 18, 2007 (CN) .......................... 2007 1 0200642

(51) Int. Cl.
*F21V 8/00* (2006.01)
(52) U.S. Cl. .................. 362/602; 362/612; 362/620; 362/626; 362/628
(58) Field of Classification Search ................ 362/600, 362/602, 612, 615, 616, 617, 619, 620, 623, 362/625, 626, 628, 632.634, 555
See application file for complete search history.

(56) References Cited

U.S. PATENT DOCUMENTS

| | | | | |
|---|---|---|---|---|
| 5,130,898 A * | 7/1992 | Akahane | ....................... | 362/632 |
| 5,791,757 A * | 8/1998 | O'Neil et al. | ................ | 362/556 |
| 6,669,350 B2 * | 12/2003 | Yamashita et al. | ........... | 362/612 |
| 7,160,010 B1 * | 1/2007 | Chinniah et al. | ............. | 362/511 |
| 2003/0169586 A1 * | 9/2003 | Miyashita et al. | .............. | 362/31 |
| 2005/0174807 A1 * | 8/2005 | Yu et al. | ..................... | 362/626 |

* cited by examiner

*Primary Examiner*—Laura Tso
(74) *Attorney, Agent, or Firm*—Frank R. Niranjan (57) ABSTRACT

An exemplary optical plate includes at least one transparent plate unit. The transparent plate unit includes a first surface, a second surface, a plurality of encircling V-shaped protrusions and a lamp-receiving portion. The second surface is opposite to the first surface. The encircling V-shaped protrusions are formed at the first surface and the second surface separately. The lamp-receiving portion is defined in one of the first surface and the second surface. A backlight module using the optical plate is also provided.

18 Claims, 9 Drawing Sheets

OPTICAL PLATE AND BACKLIGHT MODULE USING THE SAME

CROSS-REFERENCE TO RELATED APPLICATIONS

This application is related to eight copending U.S. patent applications, which are: application Ser. No. 11/835,425, filed on Aug. 8, 2007, and entitled "OPTICAL PLATE AND BACKLIGHT MODULE USING THE SAME"; application Ser. No. 11/835,426, filed on Aug. 8, 2007, and entitled "OPTICAL PLATE AND BACKLIGHT MODULE USING THE SAME"; application Ser. No. 11/835,427, filed on Aug. 8, 2007, and entitled "OPTICAL PLATE AND BACKLIGHT MODULE USING THE SAME"; application Ser. No. 11/835,428, filed on Aug. 8, 2007, and entitled "OPTICAL PLATE AND BACKLIGHT MODULE USING THE SAME"; application Ser. No. 11/835,429, filed on Aug. 8, 2007, and entitled "OPTICAL PLATE AND BACKLIGHT MODULE USING THE SAME"; application Ser. No. 11/835,430, filed on Aug. 8, 2007, and entitled "OPTICAL PLATE AND BACKLIGHT MODULE USING THE SAME"; application Ser. No. 11/835,431, filed on Aug. 8, 2007, and entitled "OPTICAL PLATE AND BACKLIGHT MODULE USING THE SAME"; and application Ser. No. 11/843,669, and entitled "OPTICAL PLATE AND BACKLIGHT MODULE USING THE SAME". In all these copending applications, the inventor is Shao-Han Chang. All of the copending applications have the same assignee as the present application. The disclosures of the above identified applications are incorporated herein by reference.

BACKGROUND OF THE INVENTION

1. Field of the Invention

The present invention relates to an optical plate for use in, for example, a backlight module, the backlight module typically being employed in a liquid crystal display (LCD).

2. Discussion of the Related Art

In a liquid crystal display device, liquid crystal is a substance that does not itself radiate light. Instead, the liquid crystal relies on light received from a light source, in order that the liquid crystal can facilitate the displaying of images and data. In the case of a typical liquid crystal display device, a backlight module powered by electricity supplies the needed light.

Figure 9:
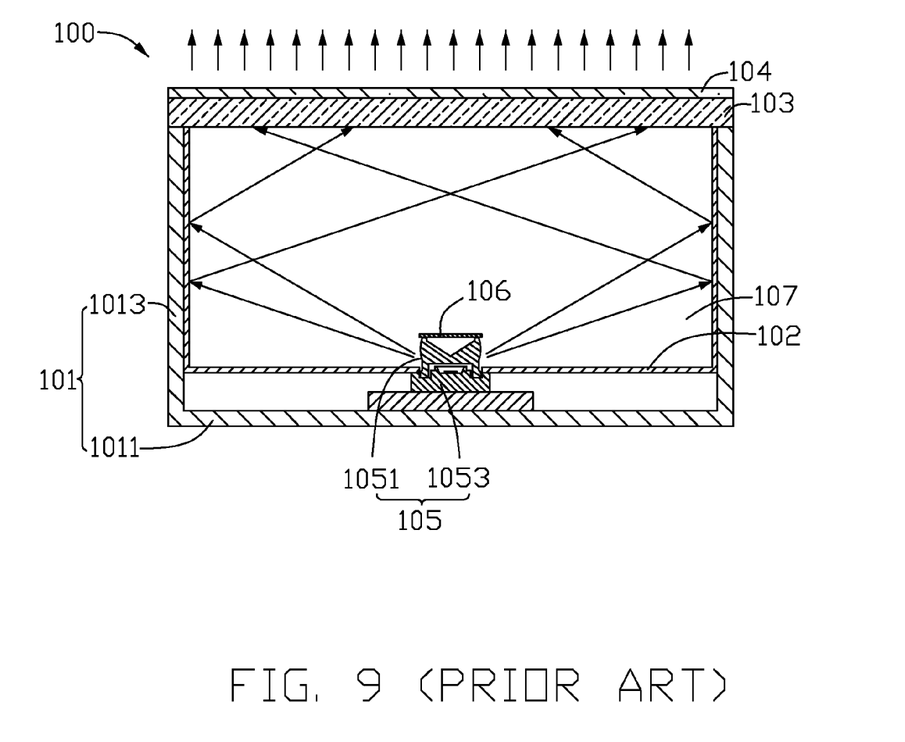
FIG. 9 is a side cross-sectional view of a conventional backlight module.

FIG. 9 represents a typical direct type backlight module 100. The backlight module 100 includes a housing 101, a light reflective plate 102, a light diffusion plate 103, a prism sheet 104, and a plurality of light emitting diodes 105 (hereinafter called LED). The housing 101 includes a rectangular base 1011 and four sidewalls 1013 extending from a periphery of the base 1011. The base 1011 and the four sidewalls 1013 cooperatively define a chamber 107. Each LED 105 includes a base portion 1053 and a light-emitting portion 1051 disposed on the base portion 1053. The LEDs 105 are electrically connected to a printed circuit board (not labeled), and the printed circuit board is fixed to the base 1011 of the housing 101. The light reflective plate 102 is disposed on the LEDs 105 in the chamber 107. The light reflective plate 102 defines a plurality of through holes (not labeled) that allows the light-emitting portions 1051 of the LED 105 to pass through and to emit light to be transmitted to the light diffusion plate 103. The light diffusion plate 103 and the prism sheet 104 are stacked in that order on the chamber 107. Light emitted from the LEDs 105 is substantially reflected by the light reflective sheet 102 to enter the light diffusion plate 103, and diffused uniformly in the light diffusion plate 103, and finally surface light is outputted from the prism sheet 104.

Generally, a plurality of dark areas may occur because of a reduced intensity of light between adjacent LEDs 105. In the backlight module 100, each LED 105 further includes a reflective sheet 106 disposed on the top of the light-emitting portion 1051, configured for decreasing the brightness of a portion of the backlight module 100 above the LEDs 105. However, the brightness of the backlight module 100 is still not uniform. One method of enhancing the uniformity of brightness of the backlight module 100 is to increase the space between the light diffusion plate 103 and the LEDs 105. This increase in space tends to eliminate dark areas. However, increasing the space between the diffusion plate 103 and the LEDs 105 will also increase the thickness of the backlight module 100, and the further overall intensity of the output light rays is reduced.

What is needed, therefore, is a new optical plate and a backlight module using the optical plate that can overcome the above-mentioned shortcomings.

SUMMARY

An optical plate according to a preferred embodiment includes at least one transparent plate unit. The transparent plate unit includes a first surface, a second surface, a plurality of encircling V-shaped protrusions and a lamp-receiving portion. The second surface is opposite to the first surface. The encircling V-shaped protrusions are formed at the first surface and the second surface separately. The lamp-receiving portion is defined in one of the first surface and the second surface.

A backlight module according to a preferred embodiment includes a housing, at least one side-lighting type point light source, an optical plate, and a light diffusion plate. The housing includes a base and a plurality of sidewalls extending from a periphery of the base, the base and the sidewalls cooperatively forming an opening. The at least one point light source is disposed on the base, each point light source having a light-emitting portion. The same optical plate as described in the previous paragraph is employed in this embodiment. The light-emitting portion of the at least one light emitting diode is inserted in the lamp-receiving portion of the optical plate correspondingly. The light diffusion plate is disposed on the housing over the opening.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present optical plate and backlight module. Moreover, in the drawings, like reference numerals designate corresponding parts throughout several views, and all the views are schematic.

DETAILED DESCRIPTION OF THE PREFERRED EMBODIMENTS

Reference will now be made to the drawings to describe preferred embodiments of the present optical plate and backlight module, in detail.

Figure 1:
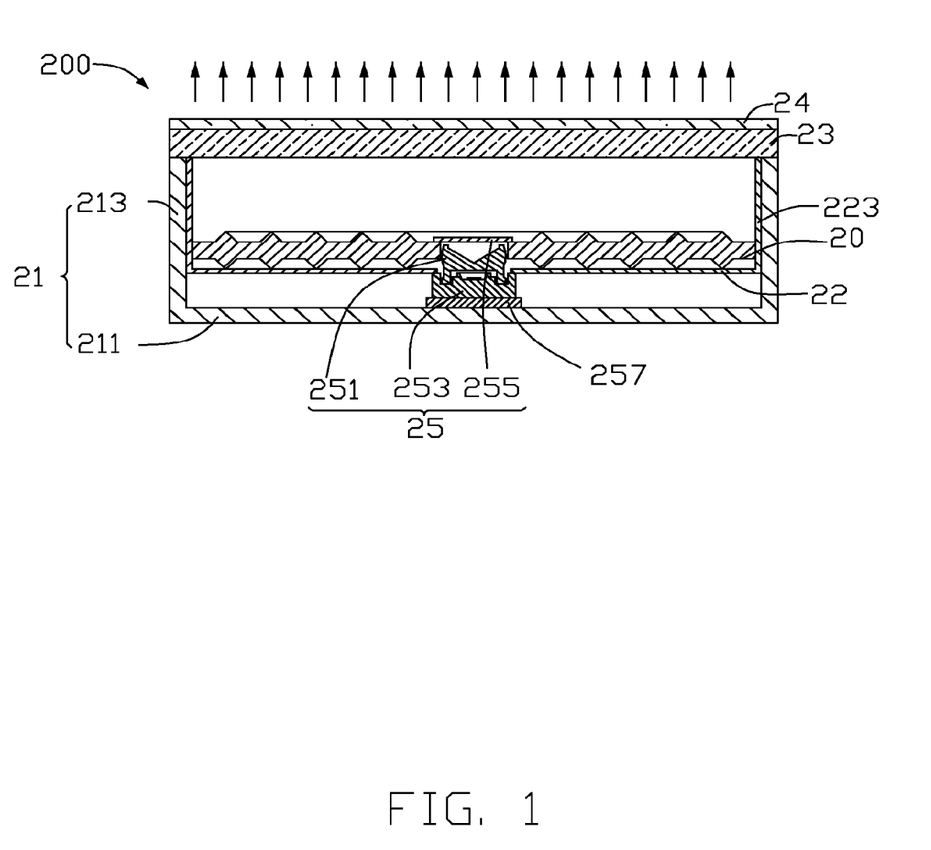
FIG. 1 is a side cross-sectional view of a backlight module using an optical plate according to a first preferred embodiment of the present invention.

Referring to FIG. 1, a backlight module 200 in accordance with a first preferred embodiment is shown. The backlight module 200 includes a housing 21, a light reflective plate 22, a light diffusion plate 23, a side-lighting type LED 25, and an optical plate 20. The housing 21 includes a rectangular base 211 and four sidewalls 213 extending around a periphery of the base 211. The sidewalls 213 cooperatively form an opening (not labeled). The light diffusion plate 23 is disposed on the housing 21 over the opening. The optical plate 20, the light reflective plate 22 and the LED 25 are received in the housing 21.

Figure 2:
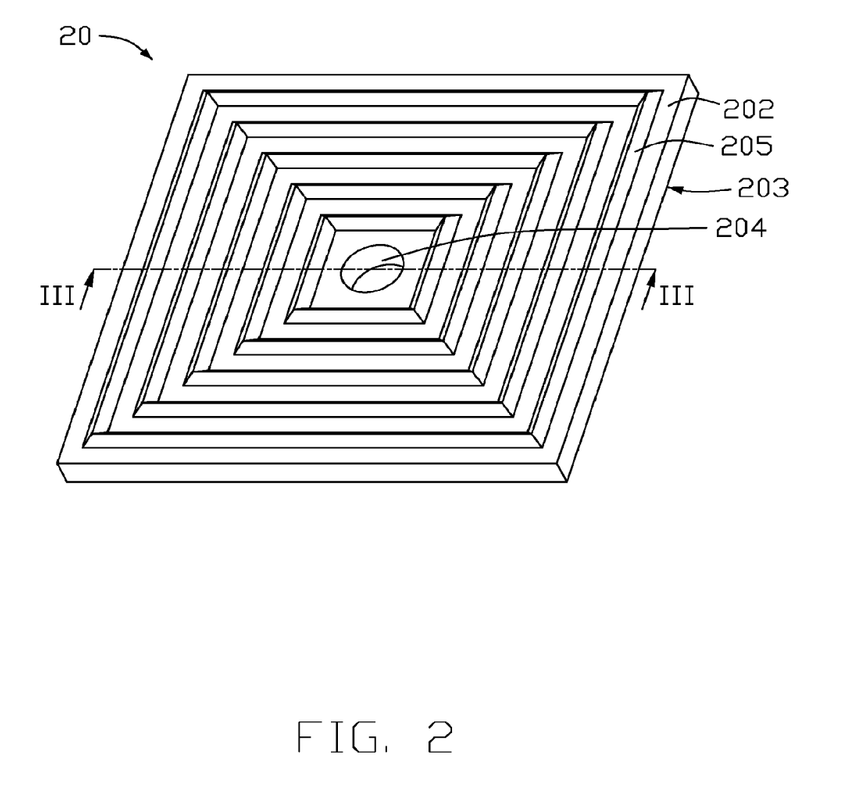
FIG. 2 is an isometric view of the optical plate of FIG. 1.
Figure 3:
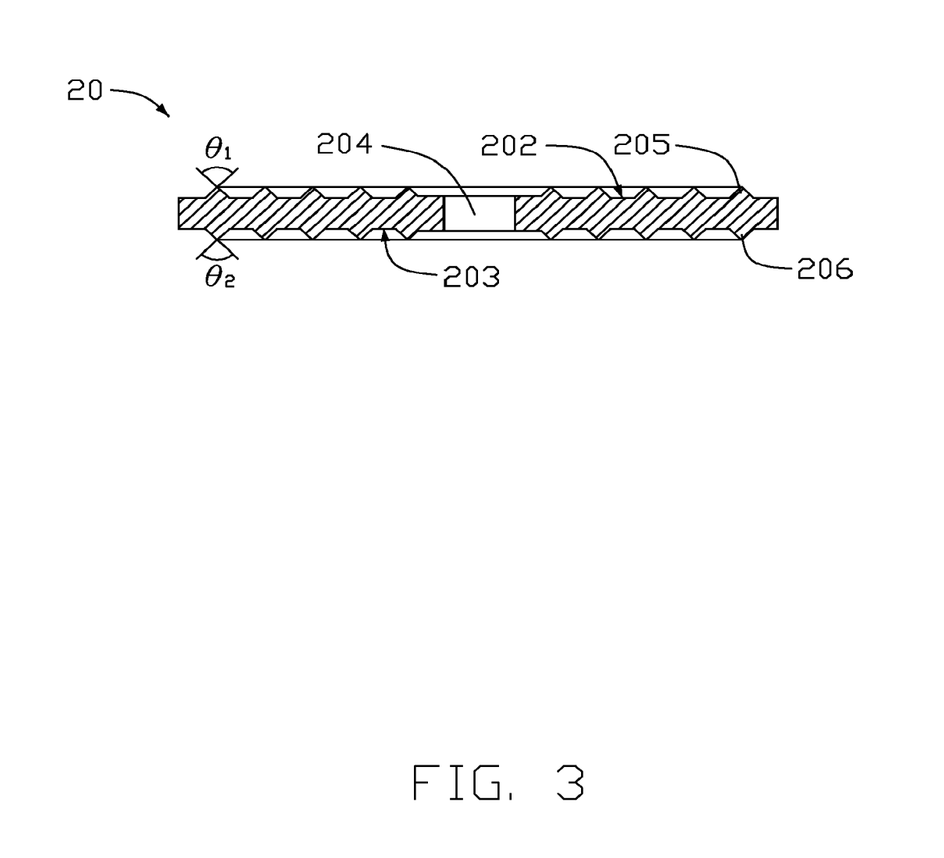
FIG. 3 is a cross-sectional view taken along line III-III of FIG. 2.

Referring to FIGS. 2 and 3, the optical plate 20 is substantially a transparent square plate, and can be mounted into the housing 21. The optical plate 20 includes a light output surface 202, and a bottom surface 203 on another side of the optical plate 20 opposite to the light output surface 202. A plurality of first encircling V-shaped protrusions 205 are formed on the light output surface 202 surrounding a center of the 20. A plurality of second encircling V-shaped protrusions 206 are formed on the bottom surface 203 corresponding to the first encircling V-shaped protrusions 205. The optical plate 20 further includes a lamp-receiving portion 204 defined at a center of the bottom surface 203. In this embodiment, the lamp-receiving portion 204 is a through hole that communicates between the light output surface 202 and the bottom surface 203. The first encircling V-shaped protrusions 205 and the second encircling V-shaped protrusions 206 have a same center whereat the lamp-receiving portion 204. The optical plate 20 can be made from material selected from the group consisting of polycarbonate (PC), polymethyl methacrylate (PMMA), polystyrene (PS), copolymer of methylmethacrylate and styrene (MS), and any suitable combination thereof.

Referring to FIG. 2, the first encircling V-shaped protrusion 205 is substantially a square on the optical plate 20. A pitch between adjacent first encircling V-shaped protrusions 205 along an X-axis direction or a Y-axis direction is configured to be in a range from about 0.025 millimeters to about 2 millimeters. Referring to FIG. 3, a vertex angle $\theta_1$ of the first encircling V-shaped protrusions 205 is configured to be, preferably, in a range from about 60 degrees to about 120 degrees. Structural properties of the second encircling V-shaped protrusion 206 is similar to that of the first encircling V-shaped protrusions 205.

Referring to FIG. 1, in the first preferred embodiment, the side-lighting type LED 25 includes a base portion 253, a light-emitting portion 251 disposed on the base portion 253, and a reflective member 255 disposed on the top of the light-emitting portion 251. The LED 25 is electrically connected to a printed circuit board 257 that is fixed to the base 211 of the housing 21. The light-emitting portion 251 of the LED 25 is inserted into the lamp-receiving portion 204 of the optical plate 20, and the light output surface 202 of the optical plate 20 faces the light diffusion plate 23. The light reflective plate 22 defines a through hole (not labeled). The light reflective plate 22 is disposed under the bottom surface 203 of the optical plate 20, the LED 25 passing through the light reflective plate 22 via the through hole.

In use, light emitted from the light-emitting portion 251 of the LED 25 enters the optical plate 20 via an inner surface of the lamp-receiving portion 204. A significant amount of light transmits to the optical plate 20. Since the surfaces of the second encircling V-shaped protrusions 206 are curved, incident light that may have been internally reflected on a flat surface, is now reflected at the curved surfaces of second encircling V-shaped protrusions 206. As a result, a greater amount of light exits the light output surface 202.

In addition, the first encircling V-shaped protrusions 205 can condense and collimate emitted light, thereby improving a light illumination brightness. Furthermore, because the side-lighting type LED 25 is positioned in the lamp-receiving portion 204, light is uniformly outputted from the light output surface 202 of the optical plate 20 except that the portion above the LED 25 has a relatively low light output illumination. Light from the optical plate 20 can be further substantially mixed in a chamber between the optical plate 20 and the light diffusion plate 23, and finally uniform surface light is outputted from the light diffusion plate 23. A distance from the LED 25 to the light diffusion plate 23 may be configured to be very short, with little or no risk of having dark areas on the portion of the backlight module 200 directly above the LED 25. Accordingly, the backlight module 200 can have a thin configuration while still providing good, uniform optical performance.

It should be pointed out that, the light reflective plate 22 can be omitted. In an alternative embodiment, a high reflectivity film can be deposited on inner surfaces of the base 211 and the sidewalls 213 of the housing 21. In other alternative embodiments, the housing 21 can be made of metal materials having high reflectivity inner surfaces.

It is to be understood that, in order to improve brightness of the backlight module 200 within a specific viewing range, the backlight module 200 can further include a prism sheet 24 disposed on the light diffusion plate 23. In addition, in order to improve light energy utilization rate of the backlight module 200, the light reflective plate 22 can further include four reflective sidewalls 223 extending around a periphery thereof and in contact with the corresponding sidewalls 213 of the housing 21.

Figure 4:
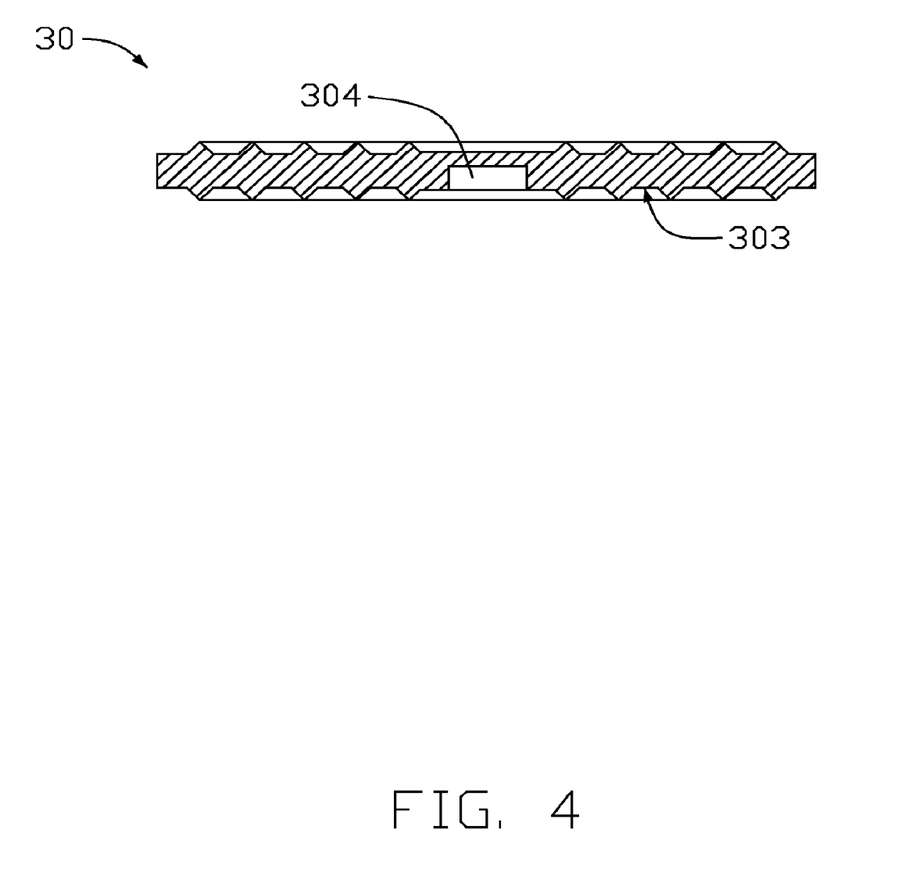
FIG. 4 is a side cross-sectional view of an optical plate according to a second preferred embodiment of the present invention.

Referring to FIG. 4, an optical plate 30 in accordance with a second preferred embodiment is shown. The optical plate 30 is similar in principle to the optical plate 20 of the first preferred embodiment, however the lamp-receiving portion 304 of the optical plate 30 is a blind hole. It should be pointed out that, a side-lighting type LED (not shown) without a reflective member can be mounted into a lamp-receiving portion 304 of the optical plate 30 to form a backlight module. Alternatively, a reflective member of the LED can also be positioned on a center of the optical plate 30 above the lamp-receiving portion 304.

Figure 5:
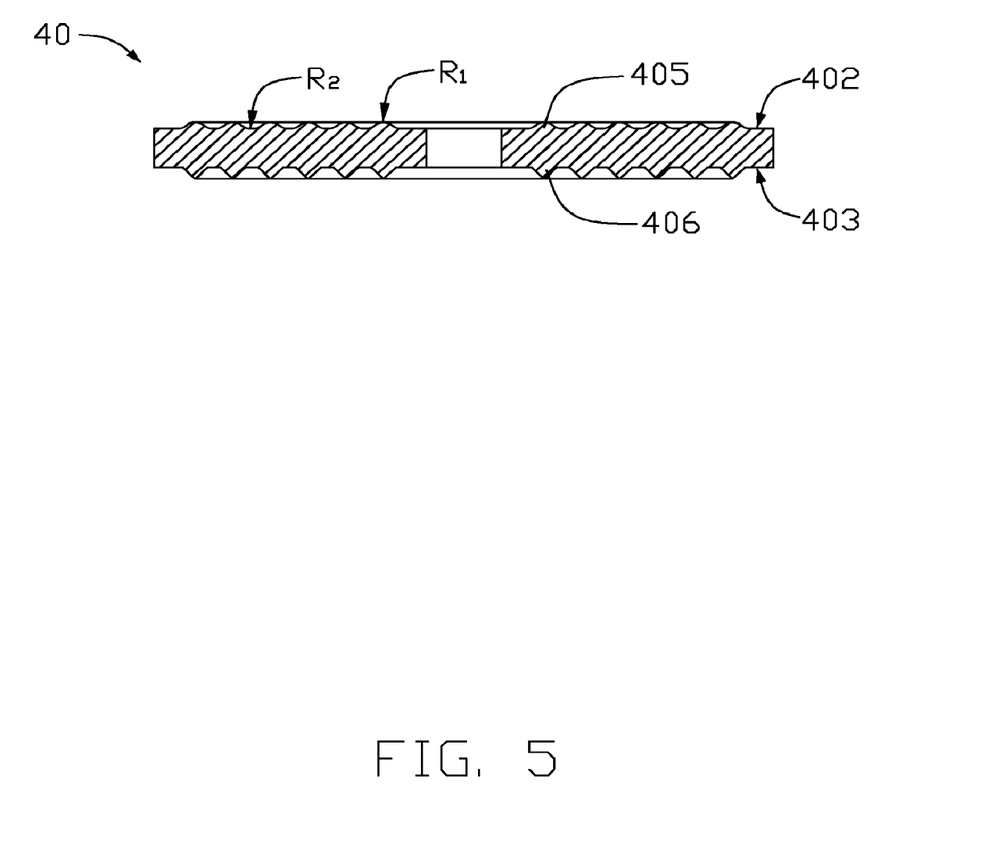
FIG. 5 is a side cross-sectional view of an optical plate according to a third preferred embodiment of the present invention.

Referring to FIG. 5, an optical plate 40 in accordance with a third preferred embodiment is shown. The optical plate 40 is similar in principle to the optical plate 20 of the first preferred embodiment. The optical plate 40 is similar in principle to the optical plate 40, except that, on a light output surface 402, either a top edge of each first encircling V-shaped protrusion 405, or a bottom edge defined by the boundary formed by the bases of two adjacent first encircling V-shaped protrusions 405 are rounded. The curvature of this rounded surface is defined by a sphere of radius R. The radius $R_1$ of the top rounded edge and the radius $R_2$ of the bottom rounded edge are equal to or less than 1.1 millimeters and greater than zero. It is to be understood that, on the bottom surface 403, a top edge of each second encircling V-shaped protrusion 406 or a bottom edge defined by the boundary formed by the bases of two adjacent second encircling V-shaped protrusions 406 can be also rounded.

Figure 6:
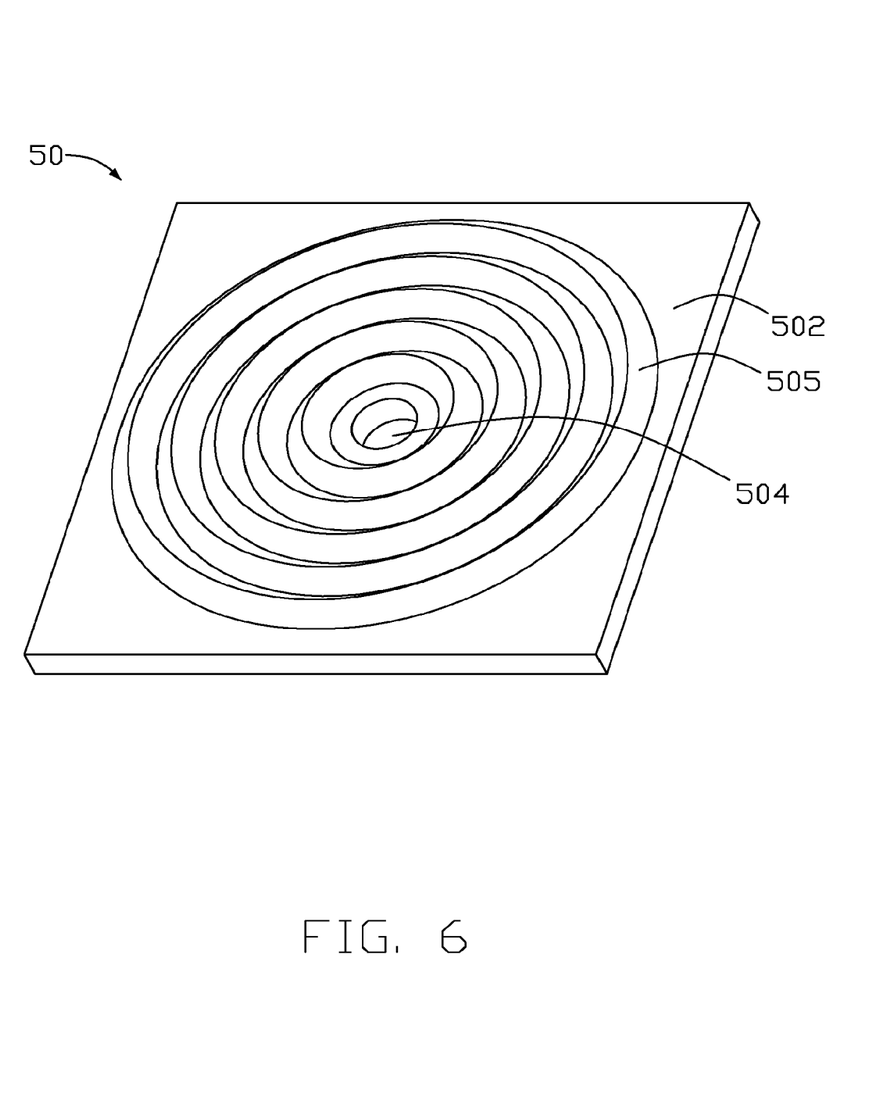
FIG. 6 is an isometric view of an optical plate according to a fourth preferred embodiment of the present invention.

Referring to FIG. 6, an optical plate 50 in accordance with a fourth preferred embodiment is shown. The optical plate 50 is similar in principle to the optical plate 40 of third preferred embodiment, however each of first encircling V-shaped protrusions 505 on a light output surface 502 of the optical plate 60 is substantially a round loop that surrounds a lamp-receiving portion 504.

Figure 7:
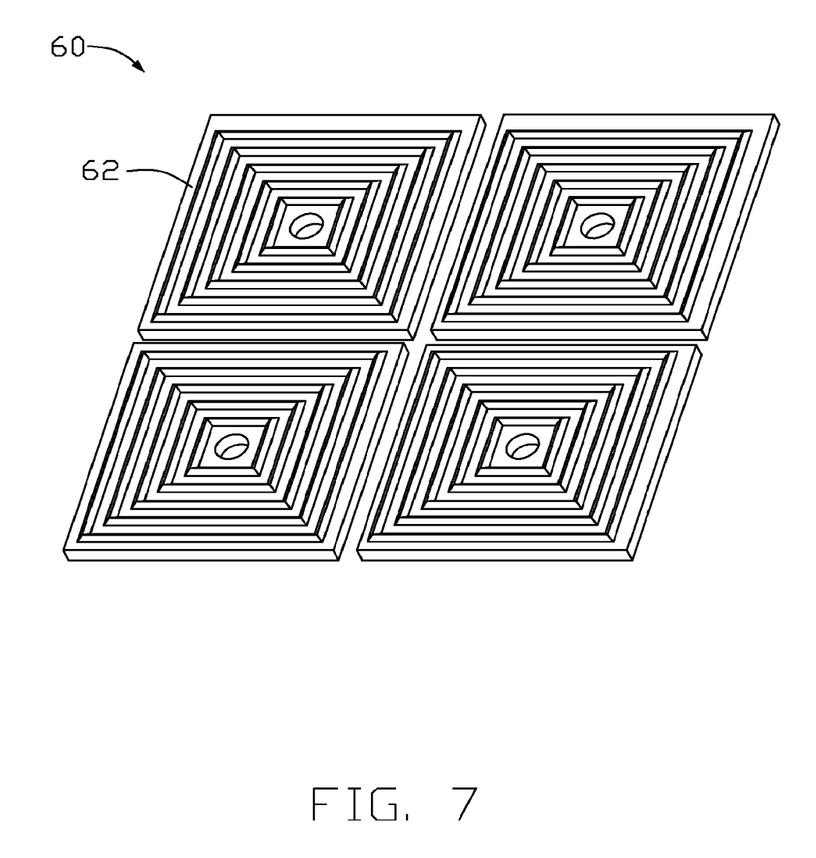
FIG. 7 is an exploded, isometric view of an optical plate according to a fifth preferred embodiment of the present invention.

Referring to FIG. 7, a combined optical plate 60 in accordance with a fifth preferred embodiment is shown. The optical plate 60 includes four transparent plate units 62. Each transparent plate unit 62 is the same as the optical plate 20 of the first embodiment. The four transparent plate units 62 can be combined with each other to form the combined optical plate 60. It is to be understood that four side-lighting type LEDs and the combined optical plate 60 can be mounted into a housing to form a larger size backlight module.

Figure 8:
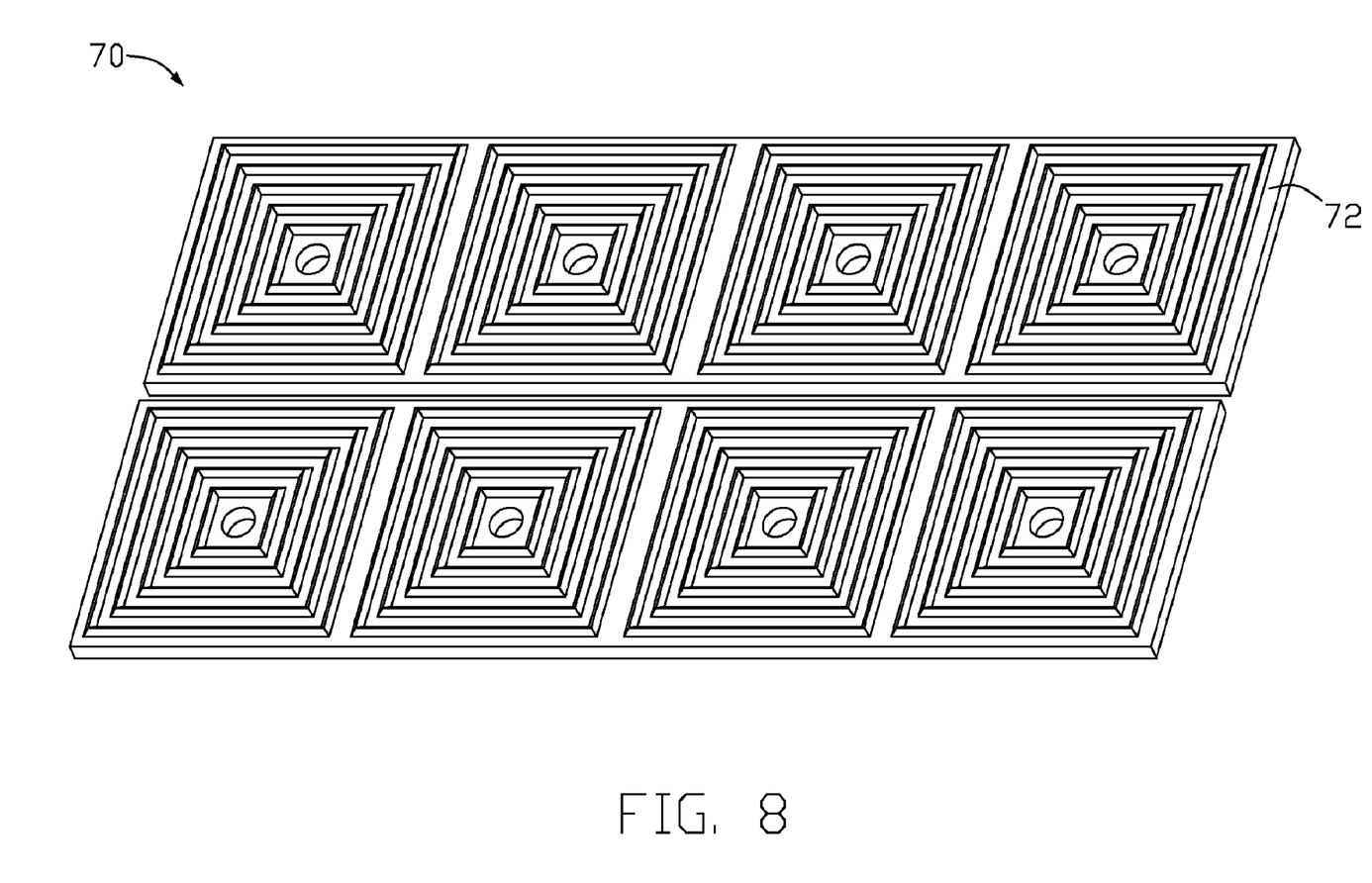
FIG. 8 is an exploded, isometric view of an optical plate according to a sixth preferred embodiment of the present invention.

Referring to FIG. 8, another combined optical plate 70 in accordance with a sixth preferred embodiment is shown. The optical plate 70 includes eight transparent plate units 72. four transparent plate units 72 correspondingly combine as a unified plate with no gap therebetween. That is the four transparent plate units 72 of optical plate 70 are integrally formed with each other. In use, a plurality of side-lighting type LEDs and the combined optical plate 70 can be mounted into a housing to form a larger size backlight module.

Furthermore, in order to increase brightness of light illumination provided by the backlight module, or mix light with different wavelengths generated by different light emitting diodes to produce white light, in the above optical plates, each transparent plate unit can further include a plurality of lamp-receiving portions for receiving the point light sources. It is to be understood that other kinds of point light source, such as field emission lamps and so on, can replace the LEDs in above embodiments.

It is noted that the scope of the present optical plate is not limited to the above-described embodiments. For example, in the backlight module 200, not only can the optical plate 20 be positioned in the housing 21 with the light output surface 202 facing the light diffusion plate 23, but the optical plate 20 can be instead positioned in the housing 21 with the bottom surface 203 facing the light diffusion plate 23. That is, the first encircling V-shaped protrusions 205 are formed at a first surface of the optical plate 20, and the V-shaped protrusions 206 are formed at a second surface of the optical plate 20. The first surface is selected from one of the light output surface 202 and the bottom surface 203, and the second surface is selected from the other one of the light output surface 202 and the bottom surface 203.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. An optical plate comprising:
   at least one transparent plate unit having:
   a first surface;
   a second surface opposite to the first surface;
   a plurality of encircling V-shaped protrusions formed at the first surface and the second surface separately; and
   at least a lamp-receiving portion defined in at least one of the first surface and the second surface.

2. The optical plate according to claim 1, wherein each of the encircling V-shaped protrusions is one of a polygon and a round in shape.

3. The optical plate according to claim 1, wherein lamp-receiving portion is located at a center of the encircling V-shaped protrusions.

4. The optical plate according to claim 1, wherein a pitch between encircling V-shaped protrusions is in a range from about 0.025 millimeters to about 2 millimeters.

5. The optical plate according to claim 1, wherein a vertex angle of each of the encircling V-shaped protrusions is in a range from about 60 degrees to about 120 degrees.

6. The optical plate according to claim 1, wherein one or more of top edge of each encircling V-shaped protrusions, and bottom edge defined by the boundary formed by the bases of two adjacent encircling V-shaped protrusions, are rounded.

7. The optical plate according to claim 6, wherein the radius of the rounded top edge and the radius of the rounded bottom edge are equal to or less than 1.1 millimeters and greater than zero.

8. The optical plate according to claim 1, wherein the lamp-receiving portion is selected from one of blind hole and through hole communicating between the first surface and the second surface.

9. The optical plate according to claim 1, wherein the optical plate includes a plurality of the transparent plate units, the transparent plate units being combined with each other.

10. A backlight module comprising:
    a housing having a base and a plurality of sidewalls extending from a periphery of the base, the base and the sidewalls cooperatively forming an opening;
    at least one side-lighting type point light source disposed on the base, each point light source having a light-emitting portion;
    an optical plate positioned in the housing, the optical plate including at least one transparent plate unit having:
    a first surface;
    a second surface opposite to the first surface;
    a plurality of encircling V-shaped protrusions formed at the first surface and the second surface separately; and
    a lamp-receiving portion defined in at least one of the first surface and the second surface, wherein the light-emitting portion of the at least one point light source is inserted in the lamp-receiving portion; and
    a light diffusion plate disposed on the housing over the opening.

11. The backlight module according to claim 10, further comprising a light reflective plate defining a through hole therein, the light reflective plate being disposed underneath the bottom surface of the optical plate, and the point light source passing through the light reflective plate via the through hole.

12. The backlight module according to claim 11, wherein the light reflective plate further comprises a plurality of reflective sidewalls extending from a periphery thereof and contact with the sidewalls of the housing.

13. The backlight module according to claim 10, wherein the housing is made of metal materials, and has high reflectivity inner surfaces.

14. The backlight module according to claim 10, further comprising a high reflectivity film deposited on inner surfaces of the base and the sidewalls of the housing.

15. The backlight module according to claim 10, further comprising a prism sheet disposed on the light diffusion plate.

16. The backlight module according to claim 10, wherein the each of the encircling V-shaped protrusions is one of a polygon and a round in shape.

17. The backlight module according to claim 10, wherein the lamp-receiving portion is selected from one of blind hole and through hole communicating with the first surface and the second surface.

18. The backlight module according to claim 10, wherein the optical plate includes a plurality of the transparent plate units, the transparent plate units being combined with each other.

* * * * *